UNITED STATES PATENT OFFICE.

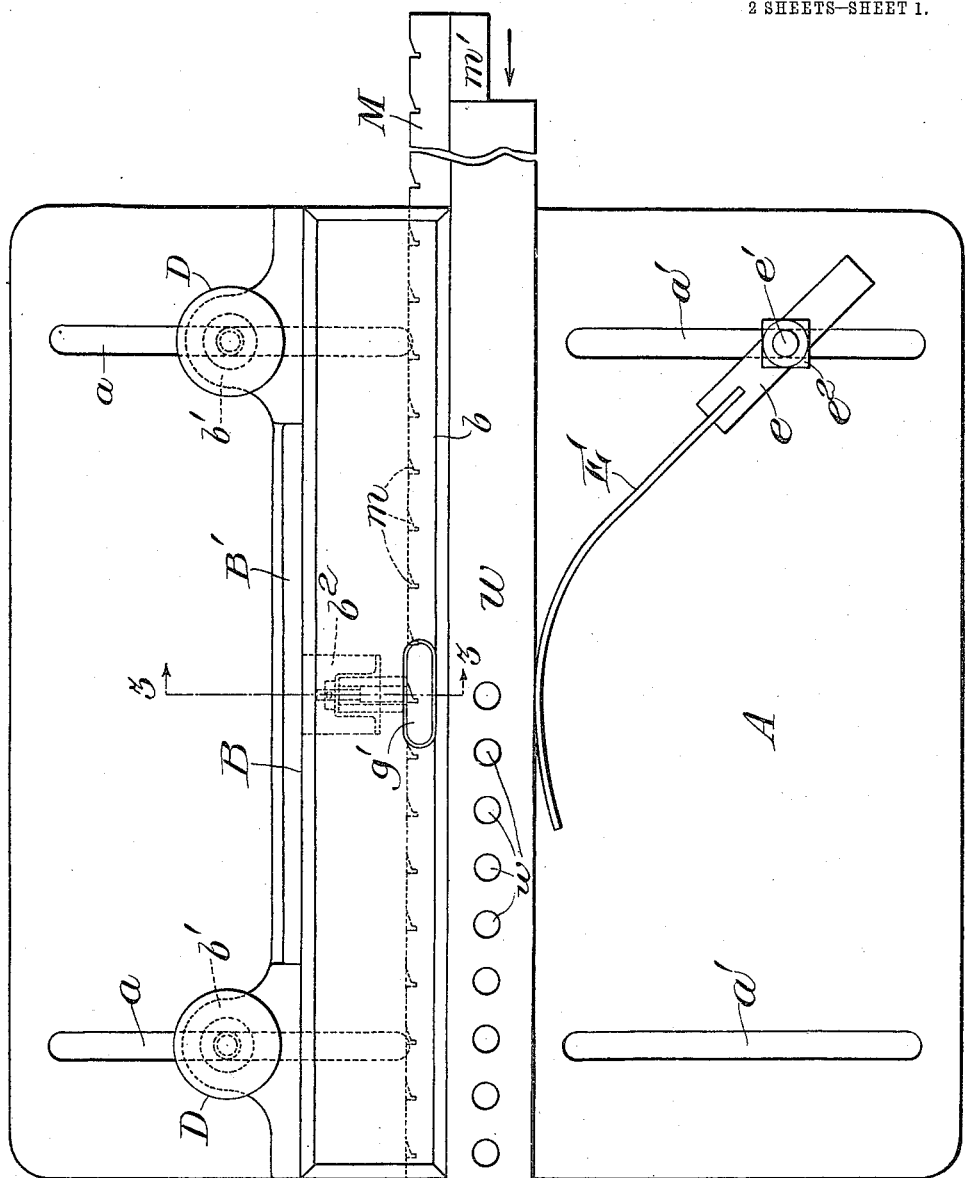

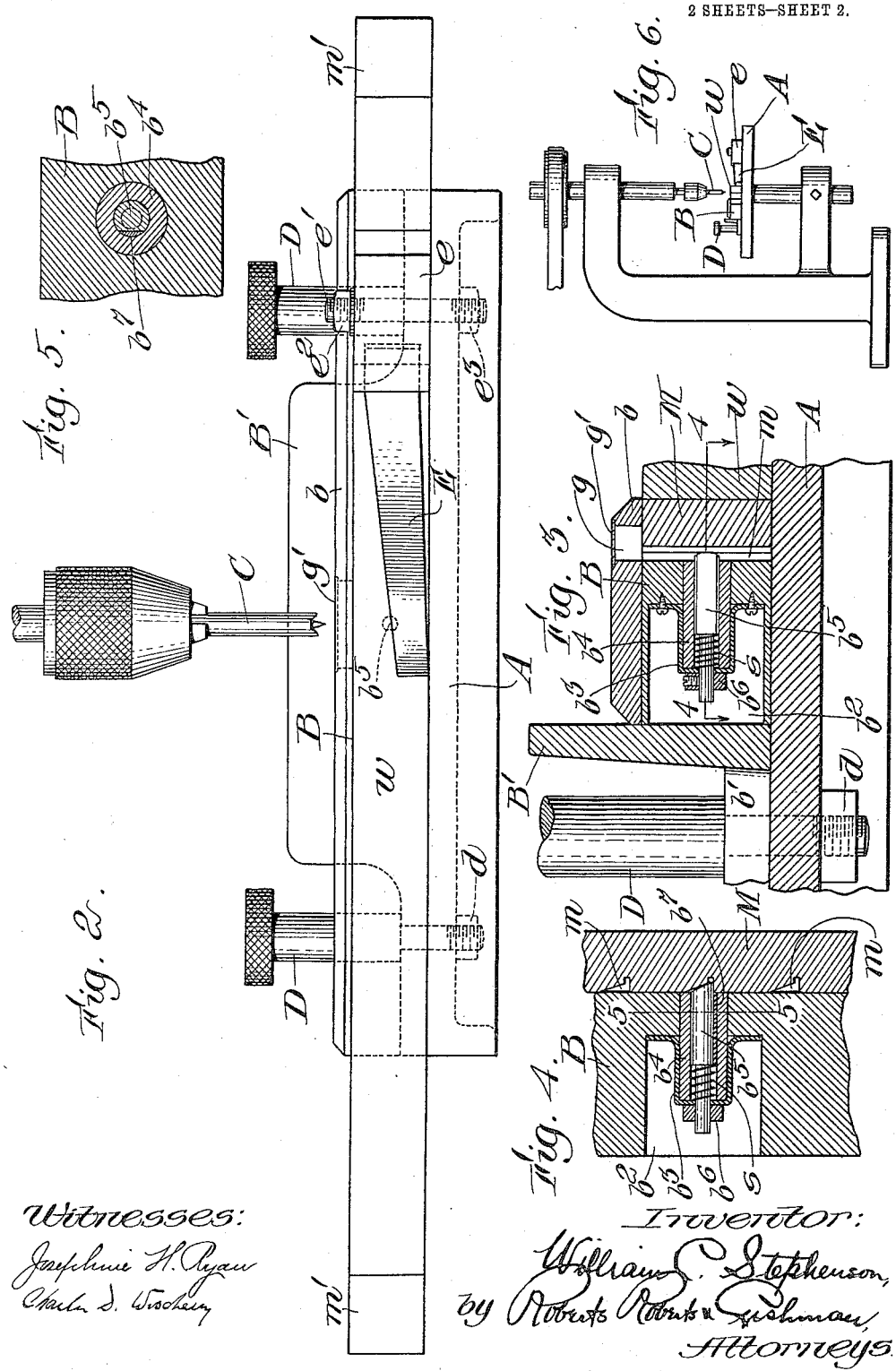

WILLIAM C. STEPHENSON, OF WOBURN, MASSACHUSETTS, ASSIGNOR TO VOSE & SON PIANO COMPANY, OF BOSTON, MASSACHUSETTS, A CORPORATION OF MASSACHUSETTS.

BORING-MACHINE.

1,124,549.

Specification of Letters Patent.

Patented Jan. 12, 1915.

Application filed June 23, 1913. Serial No. 775,227.

*To all whom it may concern:*

Be it known that I, WILLIAM C. STEPHENSON, citizen of the United States, and resident of Woburn, in the county of Middlesex and State of Massachusetts, have invented new and useful Improvements in Boring-Machines, of which the following is a specification.

This invention relates to boring machines, and particularly boring machines for woodworking, of the kind in which a pattern, usually termed a "master," is employed to determine the position in which the borings are to be made in the work. The invention consists principally in the novel and improved devices for holding, guiding and protecting the master and the work during the boring operations, and for accurately and positively positioning the work with relation to the boring tool.

In the accompanying drawings which illustrate one embodiment of the invention, Figure 1 is a plan view of the work table and the parts carried thereby, of the boring machine in its preferred form; Fig. 2 is a front view of the parts shown in Fig. 1, showing also the position of the boring tool; Fig. 3 is an enlarged cross section on line 3—3 of Fig. 1; Fig. 4 is a cross sectional view on line 4—4 of Fig. 3; Fig. 5 is an enlarged sectional view showing a detail on line 5—5 of Fig. 4; and Fig. 6 shows an end view of the machine on a reduced scale.

Referring to the drawings: A represents the work table above which is the boring tool C which is rotated in the usual way and may be operated endwise in the usual way to perform the boring operation by means of a pedal or otherwise. Mounted on the work table is the work guide consisting as herein shown of a wooden bar or strip B secured to a casting B' and provided on its upper side with a wooden cover strip $b$ which projects beyond the face of the body B of the work guide to form a top guiding flange for holding the master, presently to be described, flat on the work table. The work guide may be adjusted forwardly and backwardly on the work table to bring the work into proper relation with the boring tool C, and may be clamped in adjusted position, by means of the clamping bolts D, which pass through lugs $b'$ on the casting frame B', and also through slots $a$ formed in the work table A. Said bolts D are provided with nuts $d$ threaded to the ends of the bolts on the under side of the work table.

A recess $b^2$ is formed in the rear side of the work guide B, and a circular aperture extends forward from the recess $b^2$ to the face of the guide B. Within the recess $b^2$ is a housing $b^3$ containing a bushing $b^4$ fitted within the housing and within the aperture extending through to the face of the guide B. Sliding within the bushing $b^4$ is a latch in the form of a plunger $b^5$ which has an outer beveled edge as shown. A collar $b^6$ secured to the inner end of the plunger limits the outward movement of the plunger, and a coil spring $s$ engaging a shoulder on the plunger and the end wall of housing $b^3$ tends normally to project the plunger outward through the face of the guide B.

Adjustably mounted in one of the slots $a'$ in the work table A at the front side of the guide B, is a spring holder $e$, from which a curved leaf spring E extends to a point substantially opposite the latch $b^5$, to press the work and the master in close engagement with the work guide B. The position and tension of the spring E may be varied by adjusting the spring holder $e$ forward and backward on the table A by means of the bolt $e'$ which passes through the spring holder $e$ and the slot $a'$ and is clamped at its opposite ends by nuts $e^2$ and $e^3$.

M represents the master which may be of wood or metal and as herein shown consists of a bar having a series of notches $m$ on one side, each formed with one wall perpendicular to the face of the master and one beveled wall as shown, said notches each adapted to engage the end of latch $b^5$, and spaced to correspond with the position of the desired bores. At each end of the master M at it front side are lugs or cleats $m'$ so placed as to engage the ends of the work W, which as herein shown consists of a strip of wood in which a row of holes is to be bored, said strip W fitting snugly against the master M and between the cleats $m'$. The spring E presses against the front side of the work W holding the same in position against the master and holding both the work and the master snugly against the work guide B.

The operation of the device is as follows: The strip W to be bored is placed in position against the master M and the leading end of the work and the master are introduced at the right side of the machine as viewed in Fig. 1 against the work guide B with the notched side of the master under flange $b$, and then manually moved by the operator along the work guide and across the table toward the left. The latch $b^5$ is forced inward by the face of the master M as the latter is moved along the guide B, except when one of the notches $m$ is brought opposite the latch. Thereupon, the latch springs outward into the notch $m$ by which means the position of the work, and consequently of the boring, is determined. As soon as the latch has snapped into one of the notches the operator pushes the work and master toward the right, to insure the engaging of the rectangular side of the notch by the latch, thus positively insuring the correct positioning of the work. The operator then brings down the boring tool C in the usual way making a bore $w$ corresponding with the notch in the master which is for the time being engaged by the latch $b^5$. When this boring is completed the boring tool C is withdrawn, the operator shifts the master and the work one notch to the left, and the boring tool is again brought into operation; and so on the row of borings $w$ throughout the whole extent of the strip W may be formed, while the work is moved step by step, and the position of the borings is accurately determined by the position of the notches $m$ in the master. The overhanging flange $b$ prevents the master and the work from tilting or springing unwardly from the table, and also wholly covers and incloses the notches $m$ in the master, so that shavings and dust resulting from the boring cannot enter the notches or interfere with the proper and accurate engagement of the notches by the latch $b^5$.

To prevent the latch $b^5$ from turning in its socket, and to insure that the beveled end shall at all time face toward the work receiving end of the guide B, it is flattened on one side, and a flattened filler $b^7$ secured within bushing $b^4$, engages the flattened surface of the latch, and acts like a feather and groove to hold the latch from turning.

If desired, a slight aperture $g$ may be formed through the top of the guide flange $b$, immediately above the latch, through which the operator may observe whether the latch and notches are coöperating properly. Said sight aperture is closed by a piece of glass $g'$.

I claim:

1. In a boring machine, a work table, a work guide mounted on said table, a master adapted to slide in contact with said work guide having notches in its guide engaging surface, and a yielding latch in the face of the work guide in the path of said notches, said work guide having a top flange extending forward over the master, adapted both to prevent vertical movement of the master and to cover and protect said notches against shavings and the like.

2. In a boring machine, a work table, a work guide mounted on said table having a top flange extending beyond the face of the guide, a master fitted to slide between said top flange and said table and against said guide, said master having notches in its guide engaging surface, a yielding latch in the face of the guide in the path of said notches, and a yielding presser to hold the master in position against the work guide and under the top flange.

Signed by me at Boston, Mass., this 19th day of June, 1913.

WILLIAM C. STEPHENSON.

Witnesses:
ROBERT CUSHMAN,
CHARLES D. WOODBERRY.

Copies of this patent may be obtained for five cents each, by addressing the "Commissioner of Patents, Washington, D. C."